United States Patent
Sun (10) Patent No.: US 10,866,617 B2
(45) Date of Patent: Dec. 15, 2020

(54) WEARABLE DISPLAY DEVICE

(71) Applicant: Shanghai Tianma AM-OLED Co., Ltd., Shanghai (CN)

(72) Inventor: Zhiyang Sun, Shanghai (CN)

( * ) Notice: Subject to any disclaimer, the term of this patent is extended or adjusted under 35 U.S.C. 154(b) by 0 days.

(21) Appl. No.: 16/600,447

(22) Filed: Oct. 12, 2019

(65) Prior Publication Data

US 2020/0042037 A1 Feb. 6, 2020

(30) Foreign Application Priority Data

Jun. 29, 2019 (CN) .......................... 2019 1 0580658

(51) Int. Cl.
*G06F 1/16* (2006.01)
*G09F 9/302* (2006.01)

(52) U.S. Cl.
CPC ............ *G06F 1/163* (2013.01); *G06F 1/1643* (2013.01); *G06F 1/1652* (2013.01); *G06F 1/1686* (2013.01); *G09F 9/302* (2013.01)

(58) Field of Classification Search
CPC ...... G06F 1/163; G06F 1/1643; G06F 1/1652; G06F 1/1686; G09F 9/302
See application file for complete search history.

(56) References Cited

U.S. PATENT DOCUMENTS

| | | | | |
|---|---|---|---|---|
| 6,035,035 A | * | 3/2000 | Firooz | H04B 1/385 379/433.1 |
| 6,158,884 A | * | 12/2000 | Lebby | G04B 47/00 224/165 |
| 8,314,859 B2 | * | 11/2012 | Kim | H04N 5/2251 348/222.1 |
| 8,851,372 B2 | * | 10/2014 | Zhou | G06F 1/163 235/380 |
| 2016/0105542 A1 | * | 4/2016 | Lee | G06F 3/04886 455/566 |
| 2016/0338642 A1 | * | 11/2016 | Parara | A61B 5/7445 |
| 2017/0003757 A1 | * | 1/2017 | Gao | G06F 1/1615 |

(Continued)

FOREIGN PATENT DOCUMENTS

| | | |
|---|---|---|
| CN | 102608761 A | 7/2012 |
| CN | 105083148 A | 11/2015 |
| CN | 105453526 A | 3/2016 |

(Continued)

*Primary Examiner* — Sardis F Azongha
(74) *Attorney, Agent, or Firm* — Kilpatrick Townsend & Stockton, LLP (57) ABSTRACT

The present disclosure discloses a wearable display device which includes a flexible screen and a support component supporting the flexible screen. The flexible screen includes a fixed region and a movable region. The support component includes a fixing portion fixedly connected with the fixed region and a movable support plate fixedly connected with the movable region. The movable support plate is hinged with the fixing portion, and the movable support plate drives the movable region to rotate to a preset angle relative to the fixing portion. The technical solution of the present application can make the display screen of the wearable display device be a foldable display screen, and specifically, the user can fold the flexible screen to adjust the display direction of the flexible screen, so as to enrich the use range and use functions of the wearable display device.

20 Claims, 11 Drawing Sheets

(56) References Cited

U.S. PATENT DOCUMENTS

2018/0103132 A1* 4/2018 Prushinskiy .......... G06F 1/1652
2020/0033913 A1* 1/2020 Yang .................... G06F 1/1616

FOREIGN PATENT DOCUMENTS

| CN | 205899261 U | 1/2017 |
| CN | 107390504 A | 11/2017 |
| CN | 107864242 A | 3/2018 |
| CN | 208079142 U | 11/2018 |

* cited by examiner

WEARABLE DISPLAY DEVICE

CROSS-REFERENCE TO RELATED APPLICATION

This application claims priority of Chinese Patent Application No. 201910580658.7, filed on Jun. 29, 2019, which is hereby incorporated by reference in its entirety.

FIELD

The present disclosure relates to the field of display technologies and particularly to a wearable display device.

BACKGROUND

The flexible display device has the advantages of light weight, deformability and the like, and can be used and received in numerous states, so the flexible display device is the important trend of the modern display device development.

In the prior art, for the wearable display device, the display area is generally smaller. The wearable display device generally employs the rigid display screen which is a unibody structure and folded. When a user uses the wearable display device, the user needs to adjust his/her own pose to view and use the display screen of the wearable display device.

SUMMARY

An object of an embodiment of the invention is to provide a wearable display device, so as to enrich the use range and use functions of the wearable display device.

The wearable display device provided by an embodiment of the invention includes a flexible screen and a support component supporting the flexible screen. The flexible screen includes a fixed region and a movable region. The support component includes a fixing portion fixedly connected with the fixed region and a movable support plate fixedly connected with the movable region. The movable support plate is hinged with the fixing portion, and the movable support plate drives the movable region to rotate to a preset angle relative to the fixing portion.

Reference numbers:

| | |
|---|---|
| 1 - flexible screen | 11 - fixed region |
| 12 - movable region | 2 - support component |
| 21 - fixing portion | 22 - movable support plate |
| 220 - containing cavity | 221 - groove |
| 3 - first driving assembly | 31 - first driving component |
| 32 - driving gear | 33 - driven gear |
| 4 - second driving assembly | 41 - first driving wheel |
| 42 - second driving wheel | 43 - driving belt |
| 44 - drive spring | 45 - buckle |
| 451 - protrusion | 452 - lever |
| 4521 - first end | 4522 - second end |
| 453 - handle | 46 - spring |
| 47 - gear | 48 - rack |
| 5 - sliding block | 51 - working portion |
| 52 - rack portion | 53 - bayonet |
| 531 - first bayonet | 532 - second bayonet |
| 6 - stopper | 61 - spring buckle |

DETAILED DESCRIPTION

In order to enrich the use range and use functions of the wearable display device, an embodiment of the invention provides a wearable display device. In order to make the objects, technical solutions and advantages clearer, the invention will be illustrated below in details with reference to the embodiments.

Figure 1:
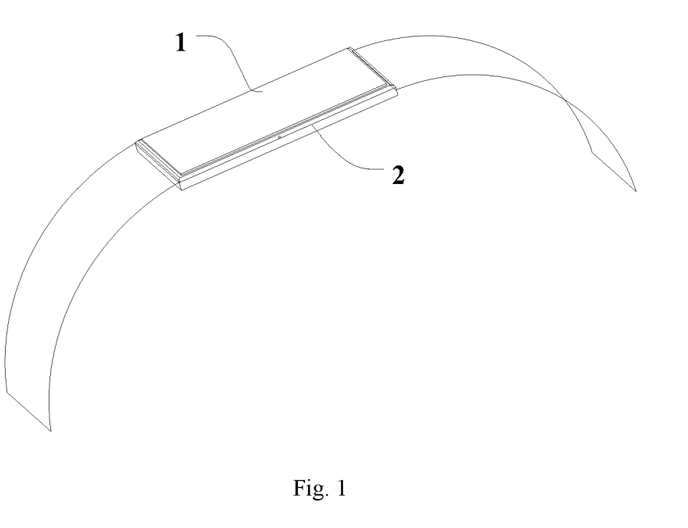
FIG. 1 is a structural schematic diagram of a wearable display device of an embodiment of the invention.
Figure 2:
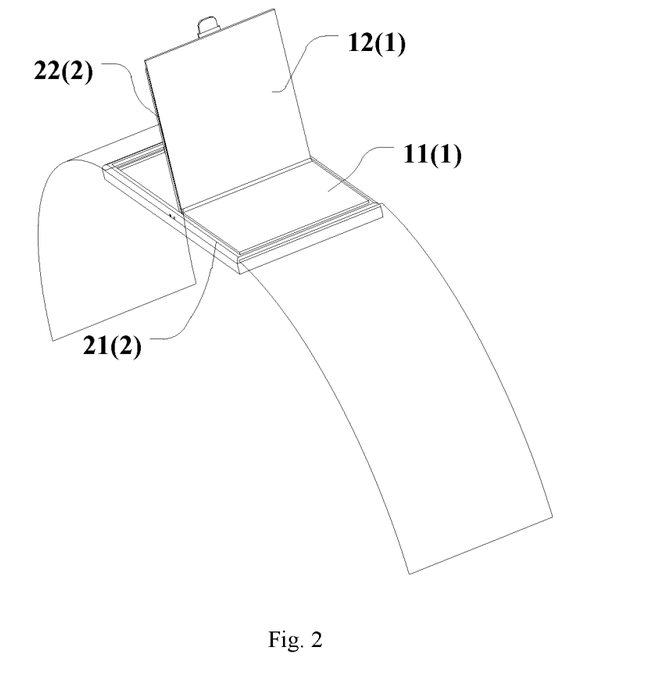
FIG. 2 is another structural schematic diagram of a wearable display device of an embodiment of the invention.
Figure 3:
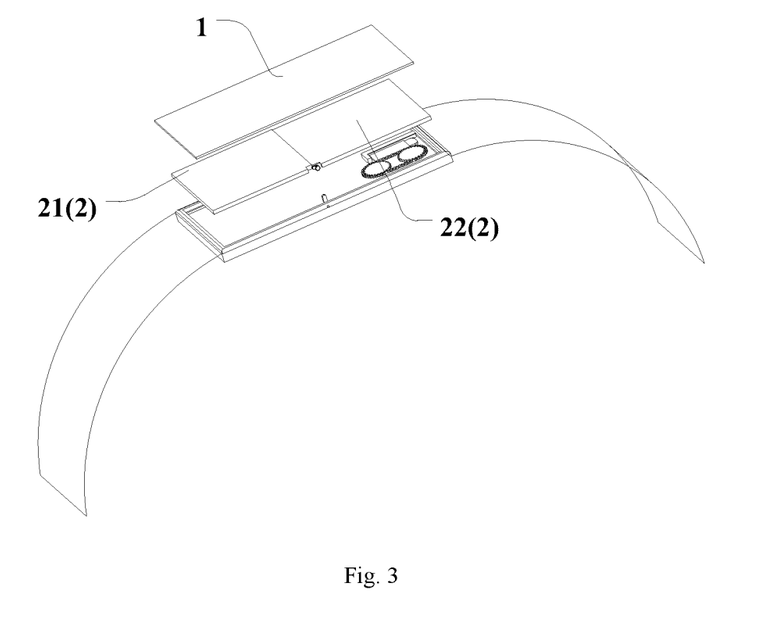
FIG. 3 is an exploded view of a wearable display device of an embodiment of the invention.

Referring to FIGS. 1 to 3, FIG. 1 is a structural schematic diagram of a wearable display device of an embodiment of the invention; FIG. 2 is another structural schematic diagram of a wearable display device of an embodiment of the invention; and FIG. 3 is an exploded view of a wearable display device of an embodiment of the invention. The wearable display device provided by the embodiments of the invention includes a flexible screen 1 and a support component 2 supporting the flexible screen 1. The flexible screen 1 includes a fixed region 11 and a movable region 12, and the support component 2 includes a fixing portion 21 fixedly connected with the fixed region 11 and a movable support plate 22 fixedly connected with the movable region 12. The movable support plate 22 is hinged with the fixing portion 21, and the movable support plate 22 drives the movable region 12 to rotate to a preset angle relative to the fixing portion 21.

In the embodiments of the invention, the display screen of the wearable display device is the flexible screen 1, the support component 2 of the wearable display device includes the fixing portion 21 and the movable support portion which is fixedly connected with the movable region 12 of the flexible screen 1, and the above movable support portion is hinged with the fixing portion 21 and can rotate about the hinge joint with the fixing portion 21, to thereby drive the movable region 12 of the flexible screen 1 to be at the preset angle relative to the fixing portion 21, as shown in FIG. 2 which is a schematic diagram where the movable support plate 22 of the wearable display device is at a preset angle relative to the fixing portion 21. In this embodiment, the movable support plate 22 can drive the flexible screen 1 to fold, so that the display screen of the wearable display device is the foldable display screen. The user can fold the flexible screen 1 to adjust the display direction of the flexible screen 1, so as to enrich the use range and use functions of the wearable display device.

Figure 4:
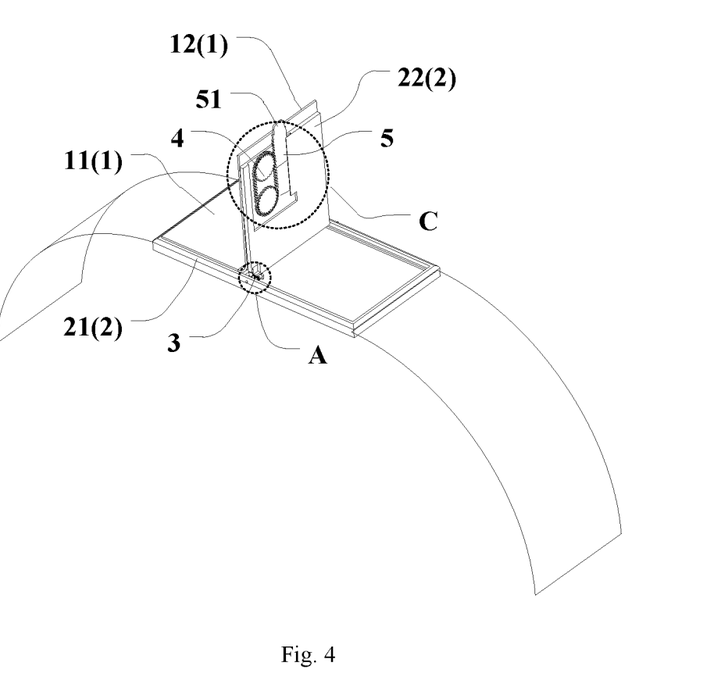
FIG. 4 is another structural schematic diagram of a wearable display device of an embodiment of the invention.
Figure 5:
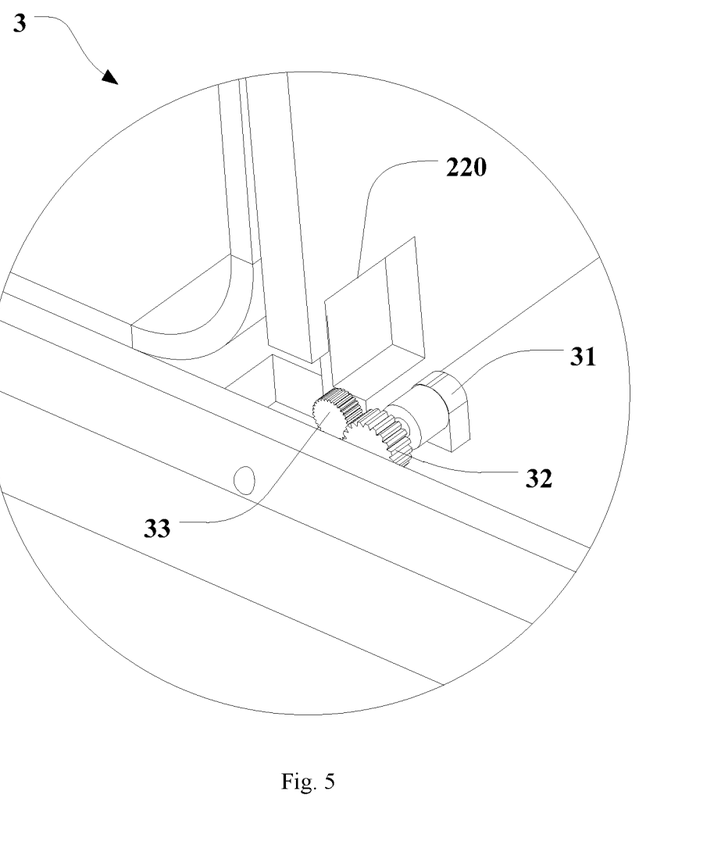
FIG. 5 is a partial enlarged diagram of the part A in FIG. 4.

Referring to FIGS. 4 and 5, FIG. 4 is another structural schematic diagram of a wearable display device of an embodiment of the invention; and FIG. 5 is a partial enlarged diagram of the first driving assembly in FIG. 4. In a further embodiment of the present application, the wearable display device further includes a first driving assembly 3 including a first driving component 31, a driving gear 32 and a driven gear 33, where the first driving component 31 is in driving connection with the driving gear 32, and the driving gear 32 engages with the driven gear 33.

In a specific embodiment, the above driven gear 33 is provided on the movable support plate 22, and the first driving component 31 and the driving gear 32 are provided on the fixing portion 21. In this embodiment, the first driving component 31 drives the driving gear 32 to rotate, and the driving gear 32 drives the driven gear 33 to rotate, to thereby drive the movable support plate 22 to rotate about the hinged shaft hinged by the fixing portion 21, so that the movable support plate 22 is at the preset angle relative to the fixing portion 21, to thereby utilize the first driving assembly 3 to control the turnover of the movable support plate 22 and drive the flexible screen 1 to fold. Furthermore, in the present application, engagement of the driving gear 32 with the driven gear 33 is utilized to limit the movable support plate 22 to the position which is at the preset angle relative to the fixing portion 21. In this embodiment, the angle between the movable support plate 22 and the fixing portion 21 can be adjusted by adjusting the specific engagement position of the driving gear 32 and the driven gear 33, to control the turnover angle of the movable region 12 of the flexible screen 1 as needed.

In a specific embodiment, the movable support plate 22 includes a containing cavity 220 configured to contain the above first driving assembly 3.

In this embodiment, the containing cavity 220 can protect the first driving assembly 3 and can also make the installation of the first driving assembly 3 more stable, facilitating the increased working stability and service life of the first driving assembly 3.

In another optional embodiment, the driving gear can also be provided on the fixing portion, and the first driving component and the driving gear are provided on the movable support plate, to thereby drive the turnover of the movable support plate.

In this embodiment, the first driving component and the driving gear of the first driving assembly are provided on the movable support plate, so there is no need for the movable support plate to be notched to avoid the first driving assembly, so that the integrality of the movable support plate is better and the strength of the movable support plate is larger, facilitating the increased stability of the moving of the movable support plate.

Figure 6:
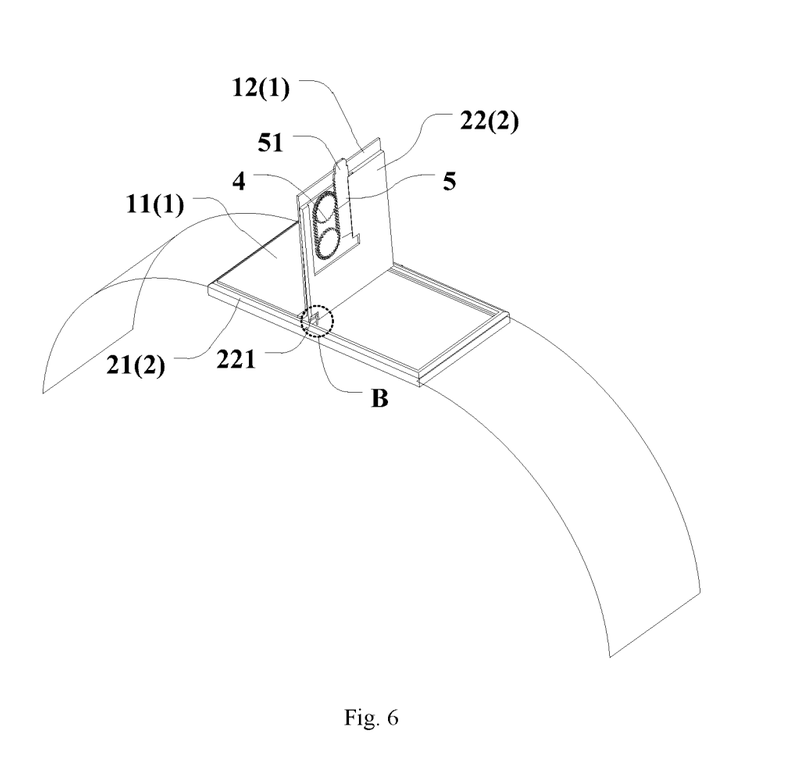
FIG. 6 is another structural schematic diagram of a wearable display device of an embodiment of the invention.
Figure 7:
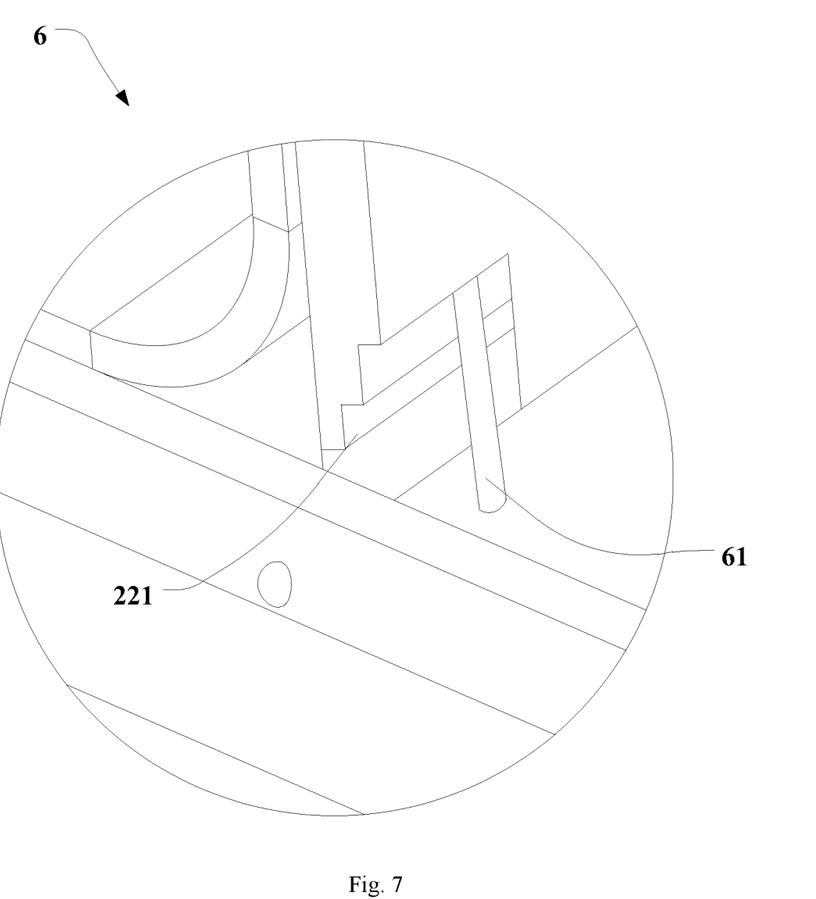
FIG. 7 is a partial enlarged diagram of the part B in FIG. 6.

Further, the above first driving component can have a control button connected thereto, and the user operates the control button to adjust the position of the movable support plate; a control software can also be configured in the wearable display device, to use the software to control the first driving component, thereby adjusting the position of the movable support plate; or the first driving component is connected with programs of the wearable display device. When the user starts the setup program of the wearable display device, the first driving component can be controlled automatically, thereby adjusting the position of the movable support plate. Referring to FIGS. 6 and 7, FIG. 6 shows a structural schematic diagram of another wearable display device; and FIG. 7 shows an enlarged structural schematic diagram of a stopper. In another embodiment of the present application, the wearable display device further includes a stopper 6 to fix the movable support plate 22 to the position which is at the preset angle relative to the fixing portion 21.

In this embodiment, the stopper 6 is configured to maintain the movable support plate 22 to the preset position, so that the movable support plate 22 is in the turnover state. In a specific embodiment, the stopper 6 can only limit the movable support plate to one preset angle. Alternatively, the stopper 6 can include multi-stage limits. The appropriate stage can be selected as needed, so that the movable support plate 22 is limited to the required position, to thereby enrich the choices of the user.

Continue referring to FIGS. 6 and 7. In a specific embodiment, the stopper 6 includes a spring buckle 61, the movable support plate 22 includes a groove 221 configured to contain the spring buckle 61.

In this embodiment, the spring buckle 61 of the stopper 6 pops up and then can rest against the groove 221, to thereby limit the movable support plate 22 to the preset angle. Specifically, the groove 221 can have a ladder cavity, so that the spring buckle 61 rests against one trench in the above ladder cavity. By selecting the different trenches, the movable support plate can accordingly be limited to the different angles, and the user makes the choice as needed.

Figure 8:
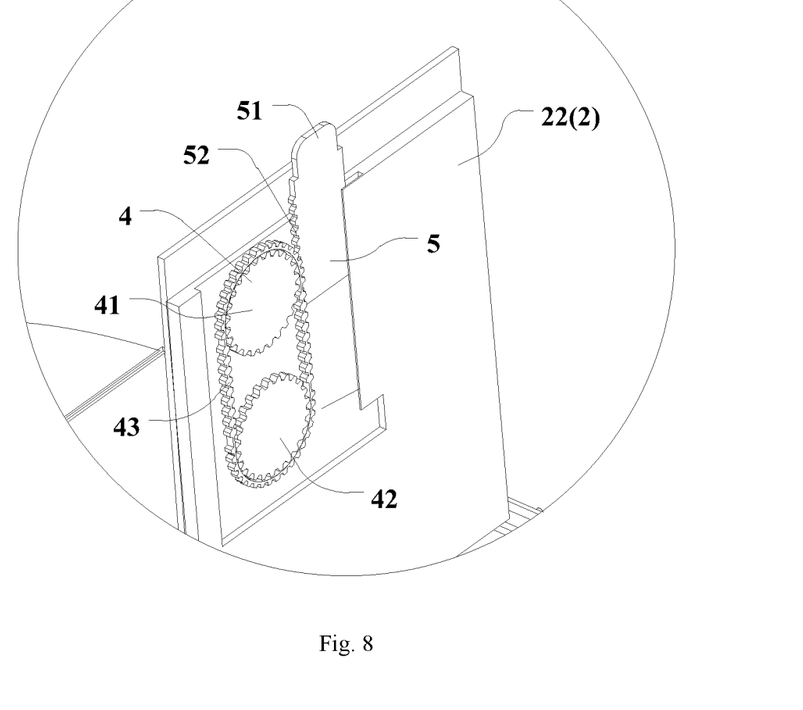
FIG. 8 is a partial enlarged diagram of the part C in FIG. 4.

Referring to FIGS. 4 and 8, FIG. 8 is a partial enlarged diagram of the second driving assembly and the sliding block in an embodiment of the present application. In a further embodiment of the present application, the movable support plate 22 is provided with a second driving assembly 4 and a sliding block 5, where the sliding block 5 is slideably provided on the movable support plate 22, the second driving assembly 4 drives the sliding block 5 to slide back and forth such that the working portion 51 of the sliding block 5 reaches out the edge of the movable support plate 22.

In this embodiment, the movable support plate 22 is provided with the sliding block 5, and the working portion 51 of the sliding block 5 can reaches out the edge of the movable support plate 22. The work module can be provided in the working portion 51 of the sliding block 5, where this work module can be a sensor, camera, voice box, voice tube or other means, so that the external structure of the wearable display device can be simplified. When the user uses the wearable display device and there is a need to use the work module provided to the sliding block 5, he/she controls the turnover of the movable support plate 22 and controls the second driving assembly 4 to drive the working portion 51 of the sliding block 5 to slide out the edge of the movable support plate 22.

Referring to FIGS. 4 and 8, in a specific embodiment, the second driving assembly 4 includes a second driving component, a first driving wheel 41, a second driving wheel 42 and a driving belt 43, where the second driving component is in driving connection with the first driving wheel 41, the driving belt 43 is provided surrounding the first driving wheel 41 and the second driving wheel 42, the outer surface of the driving belt 43 has a first driving tooth, and the sliding block 5 has a rack portion 52 engaged with the first driving tooth.

In this embodiment, the second driving component of the second driving assembly 4 drives the first driving wheel 41 to rotate, the second driving component may be an electric machine which can drive the first driving wheel 41 to rotate, and the driving belt is provided surrounding the first driving wheel 41 and the second driving wheel 42, so the second driving component can drive the driving belt to rotate along the first driving wheel 41 and the second driving wheel 42, and the first driving tooth outside the driving belt can drive the rack portion 52 of the sliding block 5 to move, to cause the working portion of the sliding block 5 to reach out the edge of the movable support portion. The operational process of this driving way is relatively stable.

Continue referring to FIG. 8. In a further embodiment, the inner surface of the driving belt 43 has a second driving tooth, the first driving wheel 41 has a third driving tooth, the second driving wheel 42 has a fourth driving tooth, and the second driving tooth is engaged with the third driving tooth and the fourth driving tooth.

In this embodiment, the inner side of the driving belt drives the first driving wheel 41 and the second driving wheel 42 via the driving teeth, to thereby increase the reliability of the driving process. The controlling of the drive ratio facilitates the increased reliability of controlling the sliding route of the sliding block 5.

Figure 9:
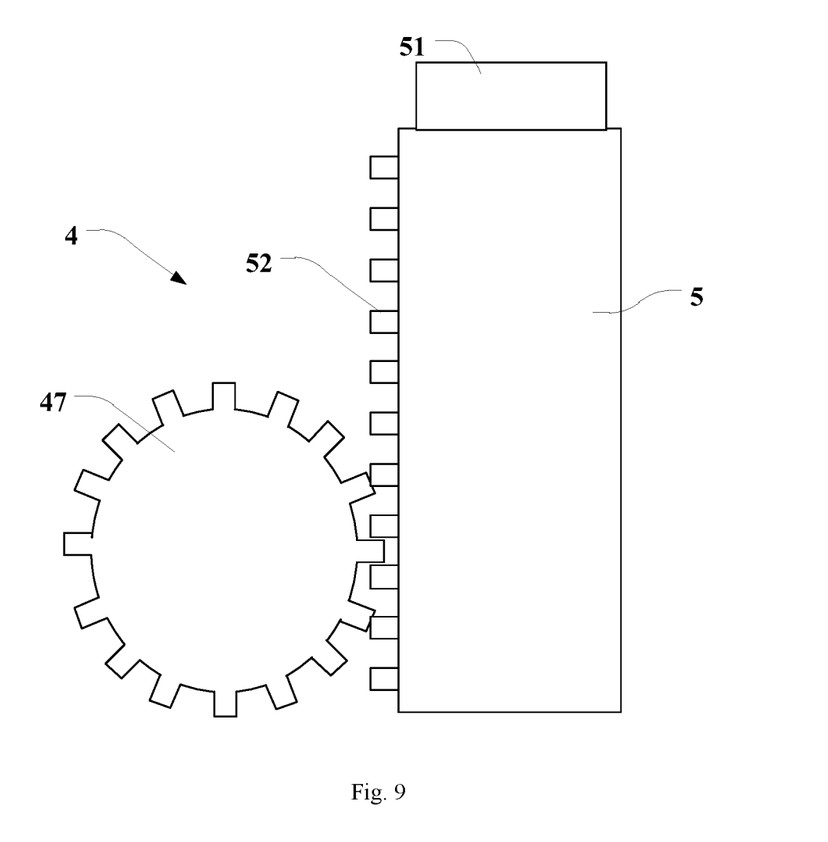
FIG. 9 is a structural schematic diagram of the second driving assembly of an embodiment of the invention.

Referring to FIG. 9, FIG. 9 shows a structural schematic diagram of the second driving assembly in an embodiment of the present application. In another specific embodiment, the second driving assembly 4 includes a third driving component and a gear 47 in driving connection with the third driving component, and the sliding block 5 has a rack portion 52 engaged with the gear 47. The third driving component may be an electric machine which can drive the gear 47 to rotate.

In this embodiment, the sliding out and taking back of the sliding block 5 is controlled by the matching of the gear 47 with the rack portion 52. The structure is relatively simple, and there is the fixed drive ratio between the gear 47 and the rack portion 52, so this solution is further convenient for controlling the sliding route of the sliding block 5.

Figure 10:
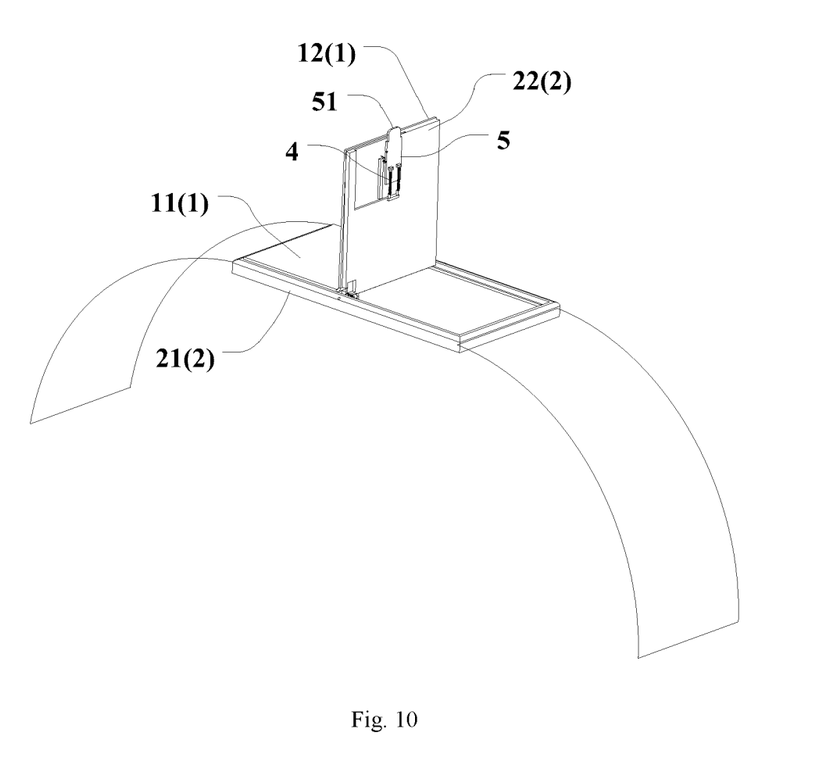
FIG. 10 is another structural schematic diagram of a wearable display device of an embodiment of the invention.
Figure 11:
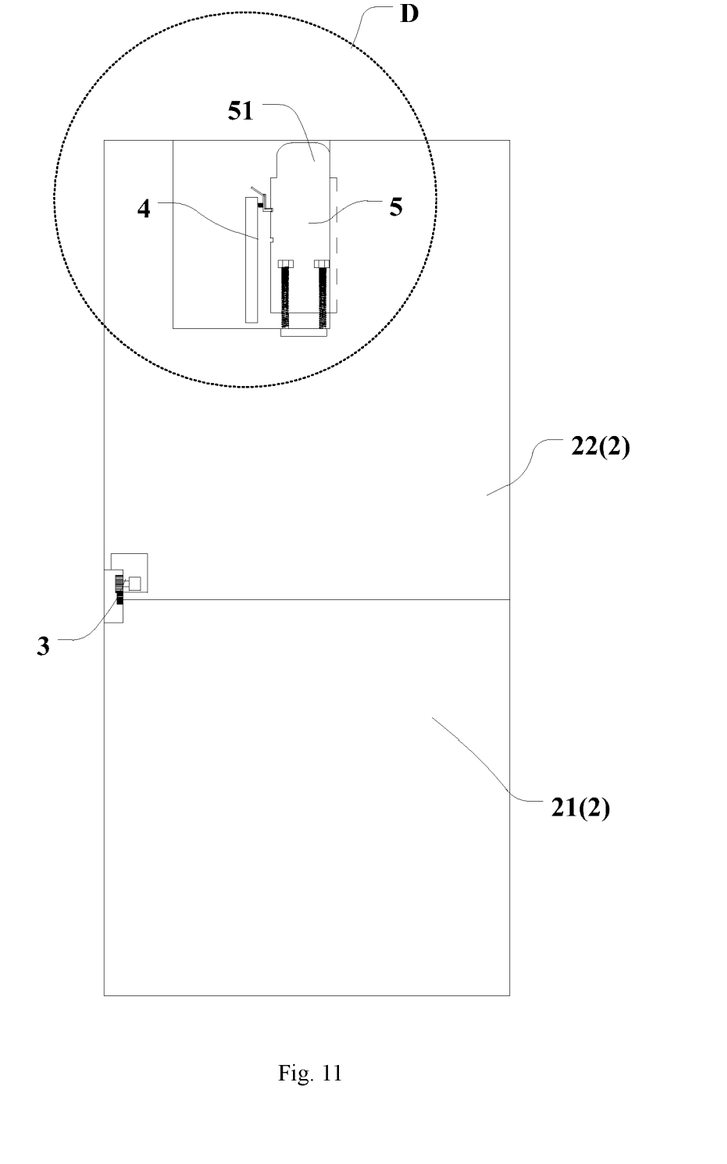
FIG. 11 is a structural schematic diagram of the back side of the support component of an embodiment of the invention.
Figure 12:
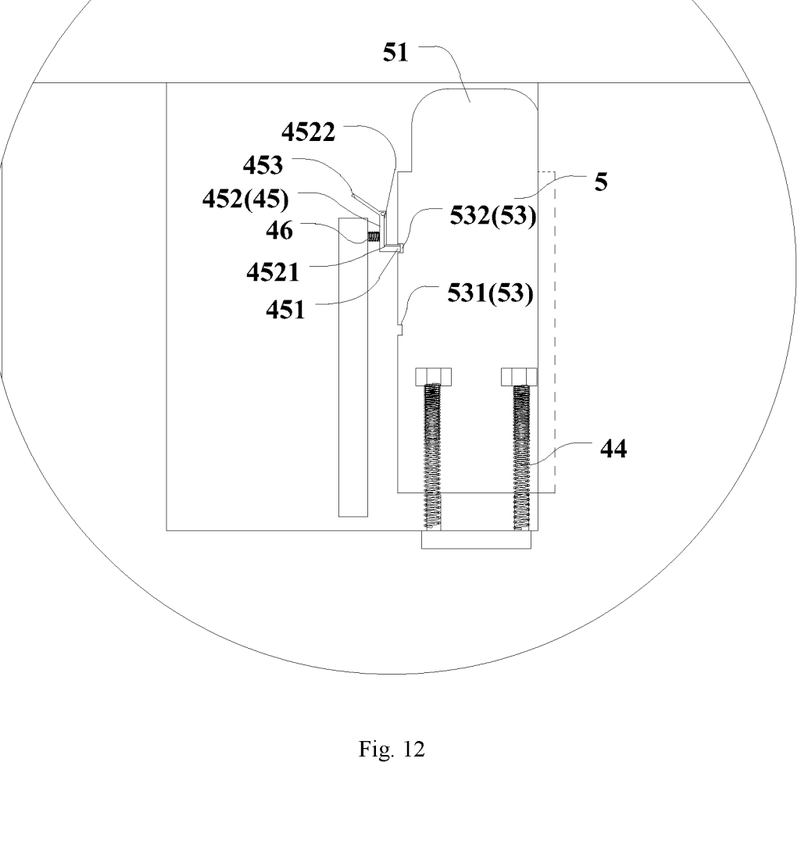
FIG. 12 is a partial enlarged diagram of the part D in FIG. 11.

Referring to FIGS. 10 to 12, FIG. 10 is another structural schematic diagram of a wearable display device of an embodiment of the invention; FIG. 11 is a structural schematic diagram of the back side of the support component of an embodiment of the invention; and FIG. 12 is a partial enlarged diagram of the second driving assembly and the sliding block in an embodiment of the invention. In another specific embodiment of the present application, the second driving assembly 4 includes a drive spring 44 and a buckle 45, where the drive spring 44 is a compression spring and connecting the sliding block 5 and the movable support plate 22, and the driving spring 44 is configured to stretch in same direction as the sliding direction of the sliding block 5; the buckle 45 is provided on the movable support plate 22, the buckle 45 includes a protrusion 451 extending towards the side wall of the sliding block 5, the side wall of the sliding block 5 has two bayonets, and the protrusion 451 can clamp in the two bayonets which are the first bayonet 531 and second bayonet 532, where the working portion 51 of the sliding block 5 is in the slide-out state when the protrusion 451 clamps in the first bayonet 531, and the working portion 51 of the sliding block 5 is in the take-back state when the protrusion 451 clamps in the second bayonet 532.

In this embodiment, the drive spring 44 is in the compressed state and then can apply the elastic force to the sliding block 5. The stretching direction of the drive spring 44 is same as the sliding direction of the sliding block 5, so the drive spring 44 can drive the sliding block 5 to stretch out the edge of the movable support plate 22. The buckle 45 can clamp in each of the bayonets of the sliding block 5, then: when the buckle 45 clamps in the first bayonet 531, the sliding block 5 is in the slide-out state under the action of the drive spring 44, and the sliding block 5 is fixed to the slide-out state under the coordination of the buckle 45 with the first bayonet 531; and when the buckle 45 clamps in the second bayonet 532, the sliding block 5 is fixed to the take-back state under the action of the buckle 45. This embodiment does not need the coordination of the driving component, and facilitates the reduced weight of the wearable display device.

In a specific embodiment, the buckle is an elastic buckle of which the elastic force is within the preset thresholds, so that the protrusion can be disengaged from one of the two bayonets when the force along the sliding direction is applied on the sliding block.

In this embodiment, when no acting force is applied on the sliding block, the protrusion clamps in the bayonet. When the acting force is applied on the sliding block, it is possible to enable the bayonet of the sliding block to overcome the clamping force with the protrusion, i.e., enable the elastic buckle to contract, to thereby disengage the protrusion from the bayonet. In the specific use, the user needs to slide the sliding block out and thus moves the sliding block towards the slide-out direction, to overcome the clamping force between the elastic buckle and the second bayonet. The sliding block slides, and when the protrusion is opposite to the first bayonet, the protrusion clamps in the first bayonet so that the sliding block is fixed to the slide-out state; when user finishes the use, he/she pushes the sliding block towards the direction of taking back the sliding block, to overcome the clamping force between the elastic buckle and the first bayonet. The sliding block slides, and when the protrusion is opposite to the second bayonet, the protrusion clamps in the second bayonet so that the sliding block is fixed to the take-back state.

Referring to FIG. 12, in another specific embodiment of the present application, the buckle 45 includes a lever 452, the protrusion 451 is at the first end 4521 of the lever 452, the middle of the lever 452 is hinged to the movable support plate 22, a spring 46 is provided at one side of the lever 452 away from the protrusion 451 and configured to maintain the protrusion 451 in the bayonet when the spring 46 is in the compressed state, and a handle 453 is provided at the second end 4522 of the lever 452 far away from the protrusion 451.

In this embodiment, the lever principle is utilized, where the middle of the lever 452 is hinged to the movable support plate 22, so the hinge joint acts as the fulcrum of the lever. By turning the handle 453 at the second end 4522 of the lever 452, the protrusion 451 at the first end 4521 of the lever 452 can be moved towards the sliding block 5 and clamps in the bayonet, or the protrusion 451 at the first end 4521 of the lever 452 can be moved away from the sliding block 5 and disengaged from the bayonet. The back side of the protrusion 451 has the spring 46 which can enable the protrusion 451 clamps in the bayonet more reliably.

In the above-mentioned embodiment, when the sliding block 5 is taken back in the edge of the movable support plate 22, the protrusion 451 clamps in the second bayonet 532. The handle 453 at the second end 4522 of the lever 452 is turned to control the protrusion 451 to move away from the sliding block 5 and be disengaged from the second bayonet 532. At this time, the drive spring 44 applies the elastic force to the sliding block 5, and the sliding block 5 slides out the edge of the movable support plate 22. At this time, under the action of the spring 46, the protrusion 451 rests against the side wall of the sliding block 5. When the sliding block 5 slides out the preset route, the protrusion 451 is opposite to the first bayonet 531, and the protrusion 451 enters the first bayonet 531 automatically under the action of the spring 46, to clamp in the first bayonet 531 and keep the sliding block 5 in the slide-out state.

In the above-mentioned embodiment, when the sliding block 5 is in the slide-out state, the protrusion 451 clamps in the first bayonet 531. The handle 453 at the second end 4522 of the lever 452 is turned to control the protrusion 451 to move away from the sliding block 5 and be disengaged from the first bayonet 531. At this time, the sliding block 5 is pressed to enable the sliding block 5 to slide into the edge of the movable support plate 22. At this time, under the action of the spring 46, the protrusion 451 rests against the side wall of the sliding block 5. When the sliding block 5 slides out the preset route, the protrusion 451 is opposite to the second bayonet 532, and the protrusion 451 enters the second bayonet 532 automatically under the action of the spring 46, to clamp in the second bayonet 532 and keep the sliding block 5 in the take-back state.

Referring to FIGS. 4 and 10, in a specific embodiment, the sliding block 5 is provided at one side of the movable support plate 22 far away from the movable region 12. In this embodiment, the surface of one side of the movable support plate 22 towards the flexible screen 1 remains smooth, so that the movable support plate 22 can provide the better support to the flexible screen 1, to increase the smoothness of the movable region 12 of the flexible screen 1.

In another specific embodiment of the present application, the movable support plate is provided with a second driving assembly and a sliding block, where the sliding block is slideably provided on the movable support plate, the second driving assembly drives the sliding block to slide back and forth, and the working portion of the sliding block can slide out the edge of the movable support plate; and the second driving assembly includes a rack which is in driving connection with the driving gear and drives the sliding block to slide.

Figure 13:
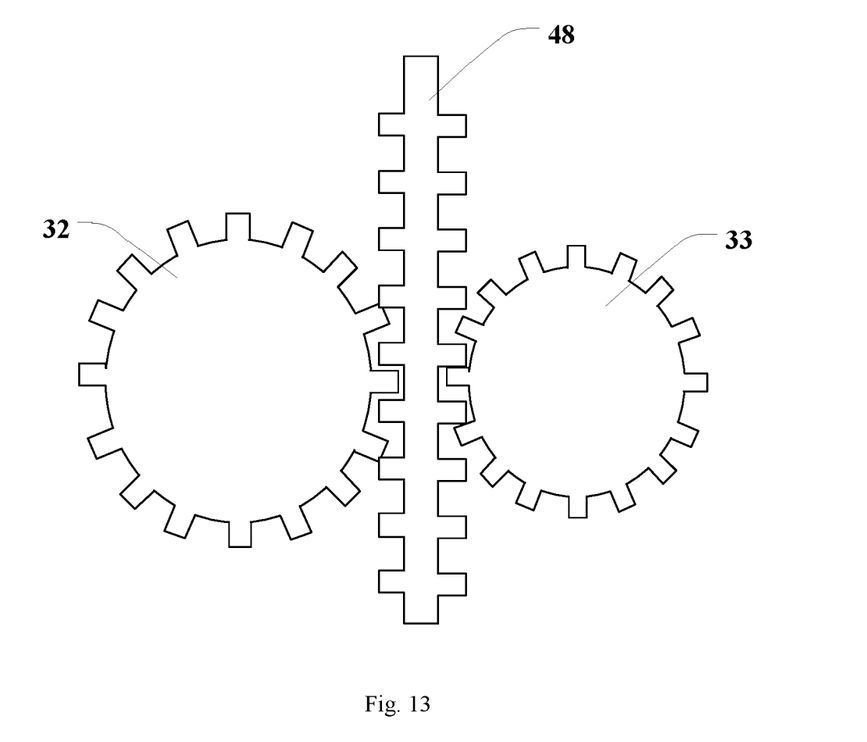
FIG. 13 is a schematic diagram of a drive way of the wearable display device in an embodiment of the invention.

Referring to FIGS. 4, 5 and 13, FIG. 13 shows a schematic diagram of a drive way of the wearable display device in an embodiment of the invention. Combined with the embodiments of FIGS. 4 and 5, in this embodiment, the second driving assembly 4 includes a rack 48 which can drive the sliding block 5 to slide, and the driving gear 32 of the first driving assembly 3 can drive the rack 48 to move, to thereby drive the sliding block 5 to slide. In this embodiment, it is possible to enable the first driving assembly 3 to simultaneously control the sliding block 5 to slide out the edge of the movable support plate 22 or back in the edge of the movable support plate 22 in the process of driving the movable support plate 22 to fold and unfold. Specifically, the first driving assembly 3 can drive the movable support plate 22 to fold and simultaneously the sliding block 5 slides out the edge of the movable support plate 22; when the first driving assembly 3 drives the movable support plate 22 to unfold, the sliding block 5 is taken back in the edge of the movable support plate 22. In this embodiment, the using of a set of driving components can achieve the linkage of the movable support plate 22 and the sliding block 5 to facilitate the operations, and on the other hand, can further simplify the structure of the wearable display device. In a specific embodiment, as shown in FIG. 13, the rack 48 can be provided between the driving gear 32 and the driven gear 33. Alternatively, the rack can also be connected with the driving gear by the multi-stage drives; furthermore, the rack can be connected with the sliding block directly, or can also be connected with the sliding block by multi-stage drives, which are not limited specifically by the present application.

In a specific embodiment, the working portion of the above sliding block is provided with a camera. In this embodiment, the movable support plate can drive the camera to rotate by the preset angle, and make the camera slide out the edge of the movable support plate, thereby facilitating the user to use the camera to capture the pictures. For example, the wearable display device is a watch or bracelet which is worn at the wrist of the user, so the user, when using the camera to perform the video call, take photos and record the video, controls the movable support plate to turn up and stretch the camera out, to thereby make the camera towards the direction of taking photos. The functions of the wearable display device can be enriched, and the camera of the wearable display device is used more conveniently.

In a further embodiment, the camera is rotatably provided on the movable support plate.

Specifically, the camera can rotate, so that the shooting angle can be adjusted by rotating the camera without the user adjusting the angle by himself/herself, which is more convenient to capture the pictures in different directions.

In a specific embodiment, the camera can be fixedly installed to the sliding block, and the sliding block is rotatably installed on the movable support plate, that is, the sliding block can not only slide relative to the movable support plate, but also rotate relative to the movable support plate.

In another specific embodiment, the camera is rotatably installed to the sliding block, the camera has a rotating shaft, the sliding block has an installation hole, the rotating shaft is rotatably installed in the installation hole, and the rotating shaft is axially fixed to the sliding block. In this embodiment, the camera is rotatably provided to the sliding block, to thereby separate the sliding drive component of the sliding block from the rotating drive component of the camera, so that the structure of the sliding drive component of the sliding block is simpler, and the structure of the rotating drive component of the camera is also simpler.

In a further embodiment, the wearable display device further includes a rotation driving component which is connected with the camera and drives the camera to rotate.

In this embodiment, the rotation driving component can be used to drive the camera to rotate, to thereby facilitate the automatic control of the camera rotation. Specifically, the above rotation driving component can have a control button connected thereto, and the user operates the control button to adjust the orientation of the camera; a control software can also be configured in the wearable display device, to use the software to control the rotation driving component, thereby adjusting the orientation of the camera; or the rotation driving component is connected with programs of the wearable display device. When the user starts the setup program of the wearable display device, the rotation driving component can be controlled automatically, thereby adjusting the orientation of the camera. For example, when performing the panorama shot, the user can keep the body of the wearable display device still, and the software program controls the rotation driving component to drive the camera to rotate automatically, to perform the panorama shot.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

What is claimed is:

1. A wearable display device, comprising:
   a flexible screen, the flexible screen comprising:
   a fixed region; and
   a movable region;
   a support component supporting the flexible screen, the support component comprising:
   a fixing portion fixedly connected with the fixed region; and
   a movable support plate fixedly connected with the movable region; and
   a first driving assembly, the first drive assembly comprising:
   a first driving component;
   a driving gear; and
   a driven gear;
   wherein the first driving component is in driving connection with the driving gear, and the driving gear engages with the driven gear;
   wherein:
   the movable support plate is hinged with the fixing portion, and the movable support plate drives the movable region to rotate to a preset angle relative to the fixing portion;
   wherein:
   the first driving component and the driving gear are provided on the movable support plate; and the driven gear is provided on the fixing portion.

2. The wearable display device of claim 1, wherein the movable support plate comprises a containing cavity configured to contain the first driving assembly.

3. The wearable display device of claim 1, further comprising:
   a stopper configured to maintain the movable support plate in the preset angle relative to the fixing portion.

4. The wearable display device of claim 3, wherein the stopper comprises a spring buckle, the movable support plate comprises a groove configured to contain the spring buckle.

5. The wearable display device of claim 1, wherein the movable support plate is provided with a second driving assembly and a sliding block, the sliding block is slideably provided on the movable support plate, the second driving assembly drives the sliding block to slide back and forth such that a working portion of the sliding block reaches out an edge of the movable support plate.

6. The wearable display device of claim 5, wherein the second driving assembly comprises:
   a second driving component;
   a first driving wheel;
   a second driving wheel; and
   a driving belt;
   wherein the second driving component is in driving connection with the first driving wheel, the driving belt is provided surrounding the first driving wheel and the second driving wheel, an outer surface of the driving belt has a first driving tooth, and the sliding block has a rack portion engaged with the first driving tooth.

7. The wearable display device of claim 6, wherein an inner surface of the driving belt has a second driving tooth, the first driving wheel has a third driving tooth, the second driving wheel has a fourth driving tooth, and the second driving tooth is engaged with the third driving tooth and the fourth driving tooth.

8. The wearable display device of claim 7, wherein the working portion of the sliding block is provided with a camera.

9. The wearable display device of claim 6, wherein the working portion of the sliding block is provided with a camera.

10. The wearable display device of claim 5, wherein the second driving assembly comprises;
    a third driving component; and
    a gear in driving connection with the third driving component;
    wherein the sliding block has a rack portion engaged with the gear.

11. The wearable display device of claim 1, wherein the movable support plate is provided with a second driving assembly and a sliding block, the sliding block is slideably provided on the movable support plate, the second driving assembly drives the sliding block to slide back and forth such that a working portion of the sliding block reaches out an edge of the movable support plate;
    the second driving assembly comprises a rack in driving connection with the driving gear, the rack drives the sliding block to slide.

12. The wearable display device of claim 11, wherein the working portion of the sliding block is provided with a camera.

13. The wearable display device of claim 5, wherein the second driving assembly comprises:
    a driving spring; and
    a buckle;
    wherein the driving spring is a compression spring and connecting the sliding block and the movable support plate, and the driving spring is configured to stretch in same direction as a sliding direction of the sliding block;
    the buckle is provided on the movable support plate, the buckle comprises a protrusion extending towards a side wall of the sliding block;
    the side wall of the sliding block has two bayonets including first and second bayonets, and the protrusion is configured to clamp in the two bayonets, wherein the working portion of the sliding block is in a slide-out state when the protrusion clamps in the first bayonet, and the working portion of the sliding block is in a take-back state when the protrusion clamps in the second bayonet.

14. The wearable display device of claim 13, wherein the buckle is an elastic buckle, and the protrusion is disengaged from one of the two bayonets when a force is applied along the sliding direction on the sliding block.

15. The wearable display device of claim 13, wherein the buckle comprises a lever with middle of the lever hinged to the movable support plate, the protrusion is provided at a first end of the lever, a spring is provided at one side of the lever away from the protrusion and configured to maintain the protrusion in the bayonet when the spring is in a compressed state, and a handle is provided at a second end of the lever far away from the protrusion.

16. The wearable display device of claim 5, wherein the sliding block is provided at one side of the movable support plate far away from the movable region.

17. The wearable display device of claim 5, wherein the working portion of the sliding block is provided with a camera.

18. The wearable display device of claim 17, wherein the camera is rotatably provided on the movable support plate.

19. The wearable display device of claim 18, wherein the camera has a rotating shaft, the sliding block has an installation hole, the rotating shaft is rotatably installed in the installation hole and axially fixed to the sliding block.

20. The wearable display device of claim 19, further comprising a rotation driving component connected with the camera and driving the camera to rotate.

\* \* \* \* \*